United States Patent
Adikari et al.

(10) Patent No.: US 9,794,623 B2
(45) Date of Patent: Oct. 17, 2017

(54) DYNAMIC COLOR DEPTH FOR HDCP OVER HDMI

(71) Applicant: Synopsys, Inc., Mountain View, CA (US)

(72) Inventors: A. A. Jithra Adikari, Ottawa (CA); Andrew Alexander Elias, Ottawa (CA); Neil Leckett, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/251,817

(22) Filed: Apr. 14, 2014

(65) Prior Publication Data
US 2015/0296253 A1 Oct. 15, 2015

(51) Int. Cl.
*H04N 7/167* (2011.01)
*H04N 21/4408* (2011.01)
*H04N 21/4363* (2011.01)
*H04N 21/43* (2011.01)
*H04N 21/44* (2011.01)
*G09G 5/02* (2006.01)

(52) U.S. Cl.
CPC .......... *H04N 21/4408* (2013.01); *G09G 5/02* (2013.01); *H04N 21/4302* (2013.01); *H04N 21/43635* (2013.01); *H04N 21/44008* (2013.01); *G09G 2358/00* (2013.01); *G09G 2370/12* (2013.01)

(58) Field of Classification Search
CPC .......... H04N 40/90; H04N 20/63; H04N 7/20; H04N 7/17318; H04N 21/435
USPC .... 725/31, 71, 131–134, 139–142, 151–153; 709/231, 232
See application file for complete search history.

(56) References Cited

U.S. PATENT DOCUMENTS

| | | | |
|---|---|---|---|
| 6,914,637 B1 * | 7/2005 | Wolf ....................... | H04L 1/203 348/473 |
| 7,242,766 B1 * | 7/2007 | Lyle ......................... | H04L 9/12 380/2 |
| 2002/0163598 A1 * | 11/2002 | Pasqualino ............ | H03L 7/085 348/725 |

(Continued)

OTHER PUBLICATIONS

High-Definition Multimedia Interface Specification Version 1.3a, Nov. 10, 2006 http://www.microprocessor.org/HDMISpecification13a.pdf , p. 276.

(Continued)

*Primary Examiner* — Annan Shang
(74) *Attorney, Agent, or Firm* — Jaquez Land Greenhaus LLP; Bruce W. Greenhaus, Esq.

(57) ABSTRACT

A method for determining the color depths of the video data for a selected frame in High-bandwidth Digital Content Protection (HDCP) video data transmitted over a High Definition Multimedia Interface (HDMI), in which (a) the beginning of the selected frame is marked with a vertical synchronization (VSYNC) signal and (b) a mark in a window of opportunity (WOO) for the selected frame indicates whether or not that frame is encrypted. The method detects, for the selected frame, the length of the interval between a VSYNC signal and the location of at least one of (i) the start of the corresponding WOO and (ii) the mark indicating whether or not the selected frame is encrypted, and then determines the color depth of the video data for the selected frame based on the detected length.

7 Claims, 1 Drawing Sheet

(56) References Cited

U.S. PATENT DOCUMENTS

| | | | | |
|---|---|---|---|---|
| 2003/0145336 A1* | 7/2003 | Matsuzaki | ............ | G09G 5/006 725/136 |
| 2006/0095623 A1* | 5/2006 | Nio | ........................ | H04N 5/445 710/260 |
| 2007/0009060 A1* | 1/2007 | Lavelle | ..................... | G06F 3/14 375/295 |
| 2007/0257923 A1* | 11/2007 | Whitby-Strevens | ... | G09G 5/006 345/520 |
| 2009/0041380 A1* | 2/2009 | Watanabe | ............... | G06F 21/84 382/276 |
| 2009/0260043 A1* | 10/2009 | Tatsuta | .................. | G09G 5/006 725/81 |
| 2010/0046751 A1* | 2/2010 | Kobayashi | ............. | H04L 29/06 380/201 |
| 2010/0095188 A1* | 4/2010 | Roethig | ............... | H04L 1/0045 714/777 |
| 2011/0150216 A1* | 6/2011 | Barry | ................... | H04N 7/1675 380/201 |
| 2012/0023331 A1* | 1/2012 | Altmann | .......... | H04N 21/43635 713/168 |
| 2012/0036549 A1* | 2/2012 | Patel | ...................... | G06F 21/10 725/153 |
| 2012/0274849 A1 | 11/2012 | Suzuki | | |
| 2014/0218608 A1* | 8/2014 | Stelliga | ............ | H04N 21/43635 348/441 |

OTHER PUBLICATIONS

Notification of transmittal of International Search Report and Written Opinion, dated Dec. 15, 2014, 9 pages.

"High-Definition Multimedia Interface, Specification Version 1.3a," Hitachi, Ltd., Nov. 10, 2006 (276 pages).

"High-bandwidth Digital Content Protection System, Revision 1.4," Digital Content Protection LLC, Jul. 8, 2009 (90 pages).

* cited by examiner

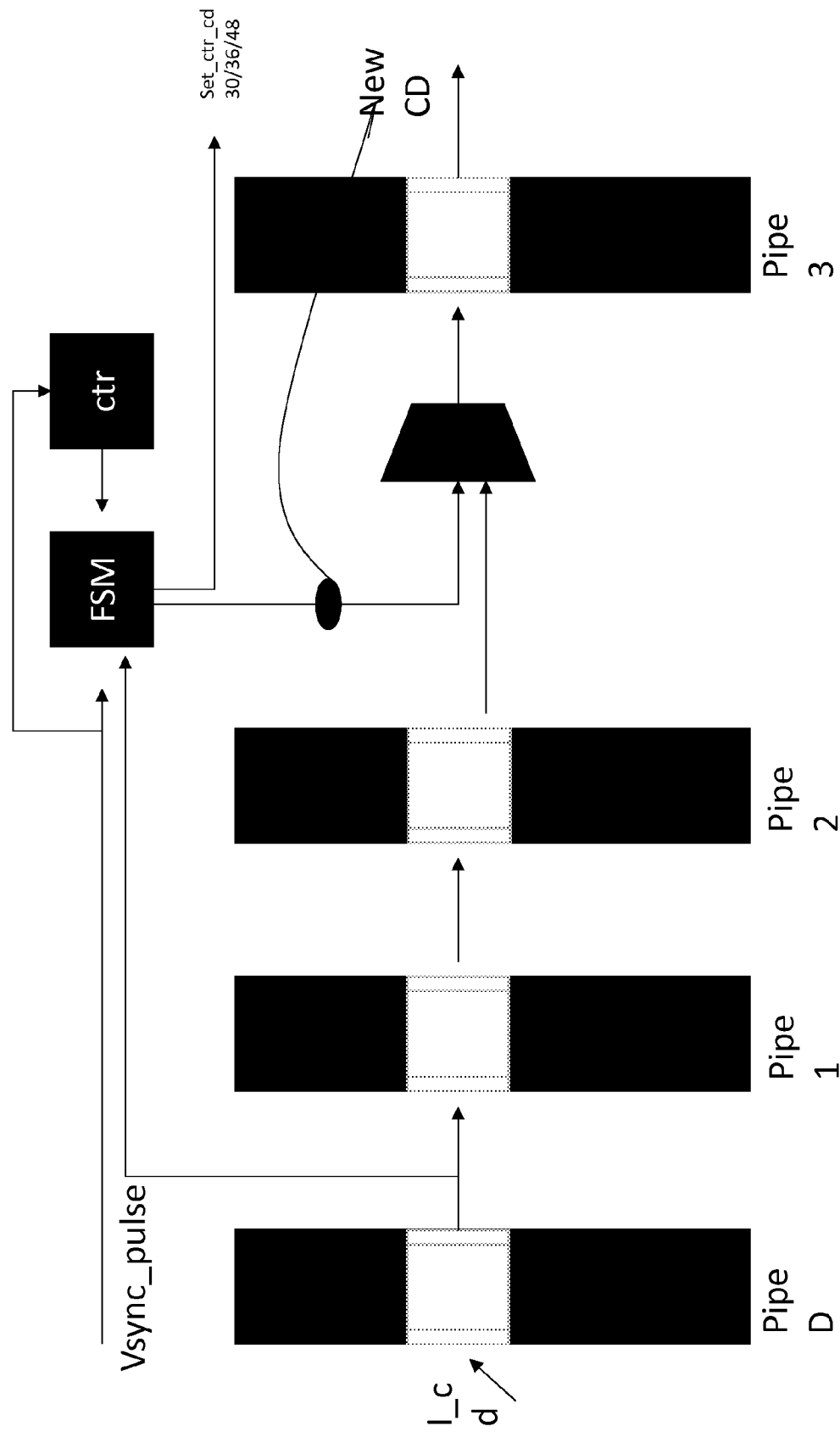

DYNAMIC COLOR DEPTH FOR HDCP OVER HDMI

FIELD OF THE INVENTION

The invention relates to the field of High-bandwidth Digital Content Protection (HDCP) over High Definition Multimedia Interface (HDMI).

BACKGROUND OF THE INVENTION (HDMI) standardizes the transfer of color depth information during the initialization of the transfer (at pre-setup). Color depth is used to describe the number of bits used in a single pixel to make up a color. The more bits per pixel, the better the transition from one color to another and the more detailed the different shades of a specific color that are adjacent to one another. Since passing the color depth information to the downstream device is optional, it is not implemented in all devices.

The High Definition Multimedia Interface (HDMI) supports video data in four different color depths defined in the frames, namely 24, 30, 36 and 48 bits. The beginning of a frame is marked with a vertical synchronization (VSYNC) signal. The video frame data is represented by pixels and categorized into three different sets, namely control data, data islands and video data. The size of each pixel corresponds to the color depth. But when the frame is transported, it is transmitted through a 24-bit bus referred to as the Transition-Minimized Differential Signaling (TMDS).

When the High-bandwidth Digital Content Protection (HDCP) standard encryption mechanism applied over HDMI, for data islands and video data. The window of opportunity (WOO) is used to mark whether a frame is encrypted or unencrypted. If the frame is encrypted, the control bus in the TMDS is marked with 4'h9 during the WOO. The value 4'h9 can only be seen in the control bus (4-bit wide) during the WOO when transmitting an encrypted frame. If the value 4'h9 is seen in the control bus outside of the WOO or in an unencrypted frame, then it is an erroneous frame. The WOO is typically defined as the interval between the $512^{th}$ and $527^{th}$ pixel clocks after the VSYNC of every frame.

With higher color depth (30, 36 or 48-bit), the pixel size is different from the TMDS bus width, therefore the WOO should be adjusted accordingly as per Table 1, which indicates the TMDS clock cycles from the rising edge of the VSYNC:

TABLE 1

| Color depth | WOO start | WOO end |
|---|---|---|
| 24 | 512 | 527 |
| 30 | 640 | 659 |
| 36 | 768 | 791 |
| 48 | 1024 | 1055 |

In some implementation, the start of the WOO is fixed to the $512^{th}$ bit clock cycles, regardless of the color depths which means that it would be impossible to properly decrypt a frame if the color depth is not set to 24-bits, because the 4'h9 signal will not be found in the proper location. In order to support these implementations along with the standard-compliant ones, an adaptive mechanism is needed to identify whether a frame is encrypted regardless of the color depth.

SUMMARY OF THE INVENTION

In accordance with one embodiment, a method is provided for determining the color depths of the video data for a selected frame in High-bandwidth Digital Content Protection (HDCP) video data transmitted over a High Definition Multimedia Interface (HDMI), in which (a) the beginning of the selected frame is marked with a vertical synchronization (VSYNC) signal and (b) a mark in a window of opportunity (WOO) for the selected frame indicates whether or not that frame is encrypted. The method detects, for the selected frame, the length of the interval between a VSYNC signal and the location of at least one of (i) the start of the corresponding WOO and (ii) the mark indicating whether or not the selected frame is encrypted, and then determines the color depth of the video data for the selected frame based on the detected length.

BRIEF DESCRIPTION OF THE DRAWINGS

Exemplary embodiments of the invention will now be described in conjunction with the following drawings, in which:

FIG. 1 illustrates a pipeline of pixels used for dynamic color depth determination.

DETAILED DESCRIPTION THE INVENTION

In one embodiment, the clock cycles are counted starting at the rising edge of the VSYNC and the correct color depth can be determined by looking at the 4'h9 signal in the control bus. The system can adaptively synchronize to the WOO based on two windowing schemes WOO on 24 bit and WOO on color depth depending on which one is used.

Referring to FIG. 1 as an example, a pipeline of four pixels can be used for establishing the color depth. When pre-authorization and authorization (pre-AUTH and AUTH) mode (as defined in the HDCP standard) of the Content Encryption Engine (CEE) are observed, a VSYNC pulse is received by a Finite State Machine (FSM) and the counters are reset. The FSM detects the 4'h9 signal in the TMDS control bus during one of four successive WOO's. The location of the 4'h9 control signal in the TMDS control (CTRL) word is determined and the color depth (CD) is inferred based on Table 2.

TABLE 2

| Location of 4'h9 in TMDS CTRL word | Color depth |
|---|---|
| 512 | 24 |
| 640 | 30 |
| 768 | 36 |
| 1024 | 48 |

If the 4'h9 bits are not found at these locations the previous color depth is used. Once the color depth is established, the location of the 4'h9 control signal is known and frames can properly be decrypted.

In one embodiment, the adaptive color depth detection is implemented with Low Hardware Resources Solution and with few Blank Frames.

The CEE collects the color depth information of a first few encrypted frames based on TMDS-CTRL signal set to 4'h9. Then uses the detected color depth to find the location of the 4'h9 signal to properly decrypt the frames. Until the color depth is determined, all frames are set to the color depth of the last unencrypted frame.

In another embodiment, the adaptive color depth detection is implemented with a High Resources Solution without losing encrypted frames.

In this case, the CEE is prepared for decryption at the rising edge of the Vertical Synchronisation (VSYNC) of the first frame in PRE-AUTH and AUTH mode. The 4'h9 signal is located in the WOO and the color depth is assigned as per table above then the decryption start immediately.

These embodiments are implemented on a frame by frame basis and can be performed using software, hardware or a combination of both.

If the HDMI signals are noisy, other variations can be implemented such as collecting statistics on the position of the 4'h9 signals to increase the speed at which it is located. Optionally a histogram of the location can be generated over a period of time and the histogram along with optional additional statistical methods can be used to predict the location of the 4' h9 signal, which is the color depth as per table 1.

Numerous other embodiments may be envisaged without departing from the spirit or scope of the invention.

What is claimed is:

1. A method of processing a video data frame in High-bandwidth Digital Content Protection (HDCP) video data transmitted over a High Definition Multimedia Interface (HDMI), in which (a) a beginning of a selected frame is marked with a vertical synchronization (VSYNC) signal and (b) a mark in a window of opportunity (WOO) for the selected frame indicates whether or not that frame is encrypted, said method comprising:
    determining a color depth of the video data in the selected frame, and
    adjusting a number of clock cycles to a starting location of the window of opportunity for the selected frame, based on the determined color depth.

2. The method of claim 1 in which the color depth of the video data is determined from a General Control Packet (GCP) transmitted over the HDMI.

3. The method of claim 1 in which the location of the starting point of the WOO is 512 clock cycles multiplied by the ratio of the color depth to 24.

4. The method of claim 1 further comprising adjusting a number of clock cycles to an ending point of the window of opportunity.

5. The method of claim 4 in which the location of an ending point of the WOO is 528 clock cycles multiplied by the ratio of the color depth to 24 minus 1.

6. The method of claim 1 further comprising maintaining statistics on the location of the WOO to increase the speed at which it is located.

7. The method of claim 6 further comprising maintaining histogram on the historical values of the WOO locations.

* * * * *